Aug. 22, 1967  J. V. HENSON  3,337,259
MOBILE BUILDINGS, DWELLINGS AND SHELTERS
Filed June 4, 1965  3 Sheets-Sheet 1
FIG. 1
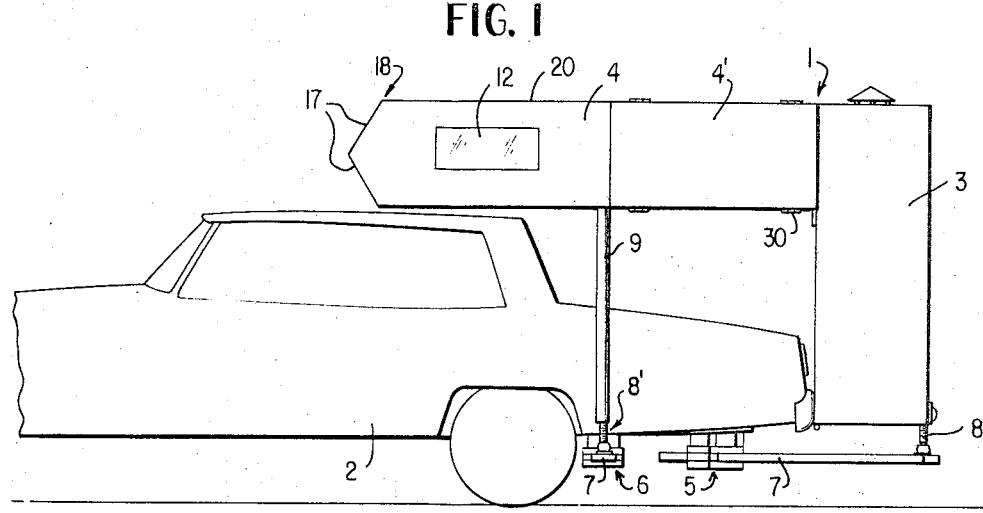
FIG. 2
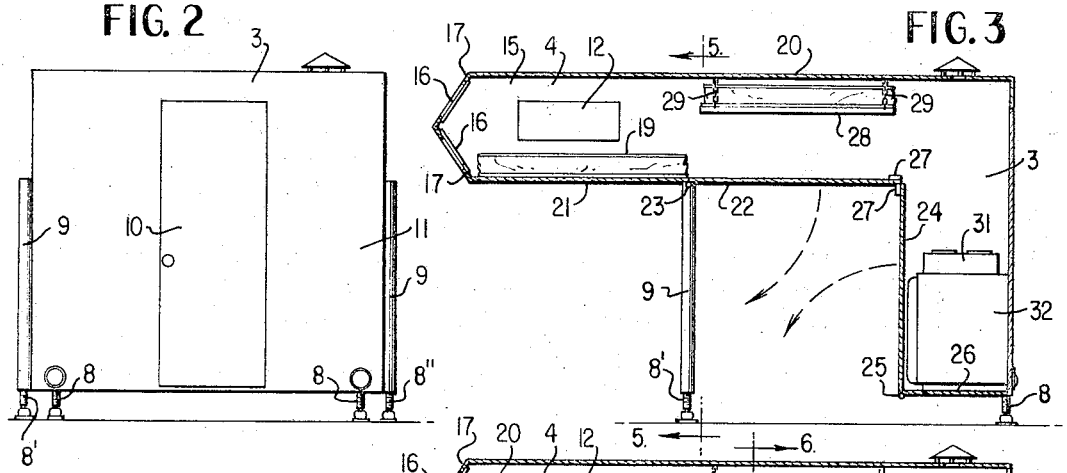
FIG. 3
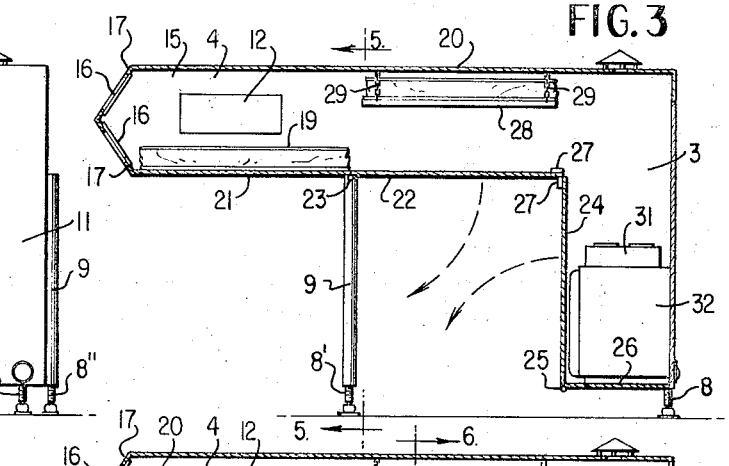
FIG. 4
FIG. 10
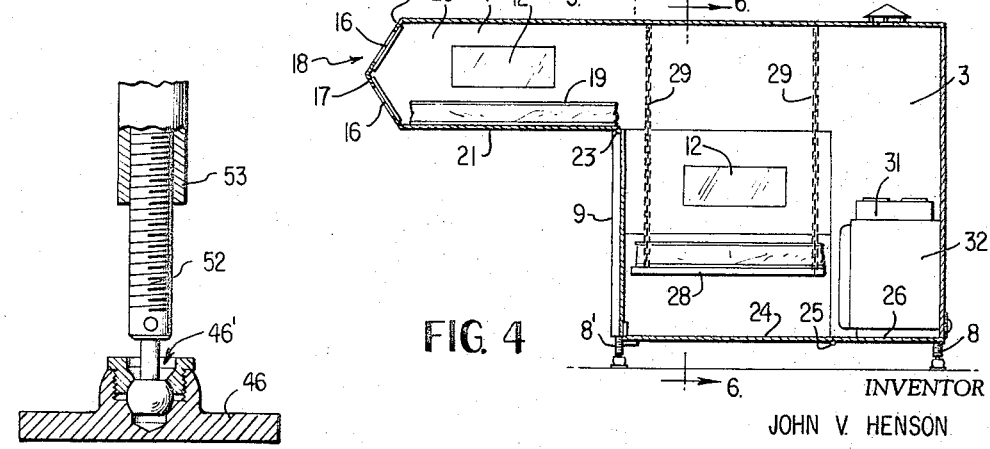
INVENTOR
JOHN V. HENSON
BY *James H. O'Boyle*
ATTORNEY

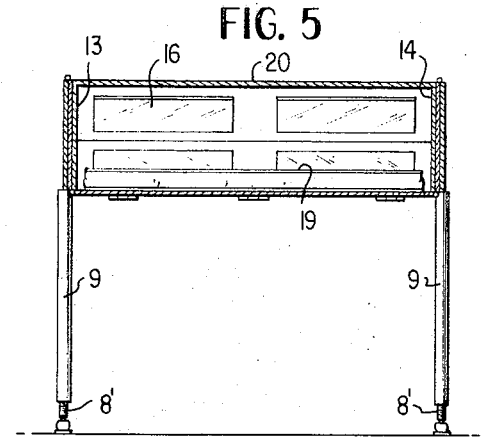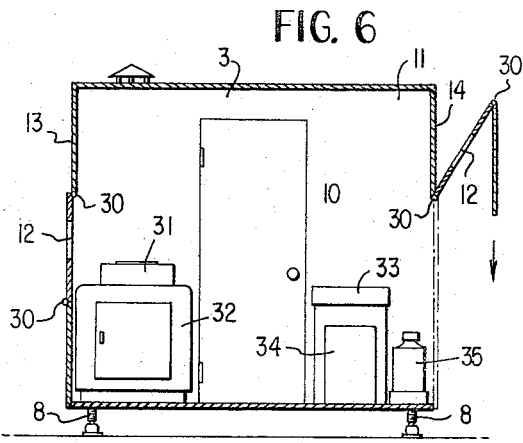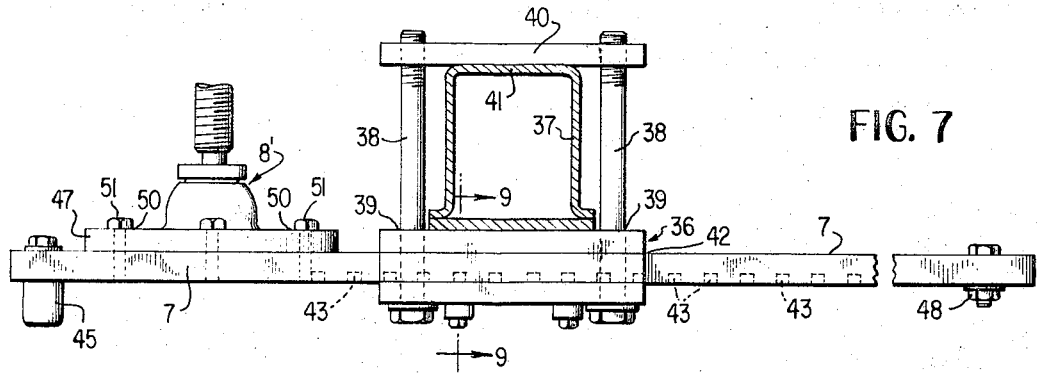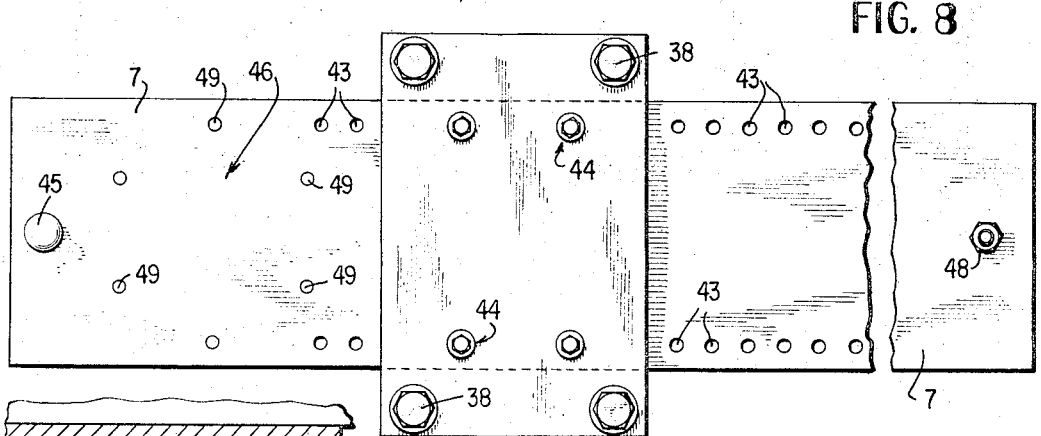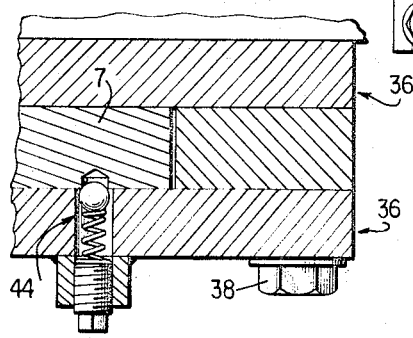

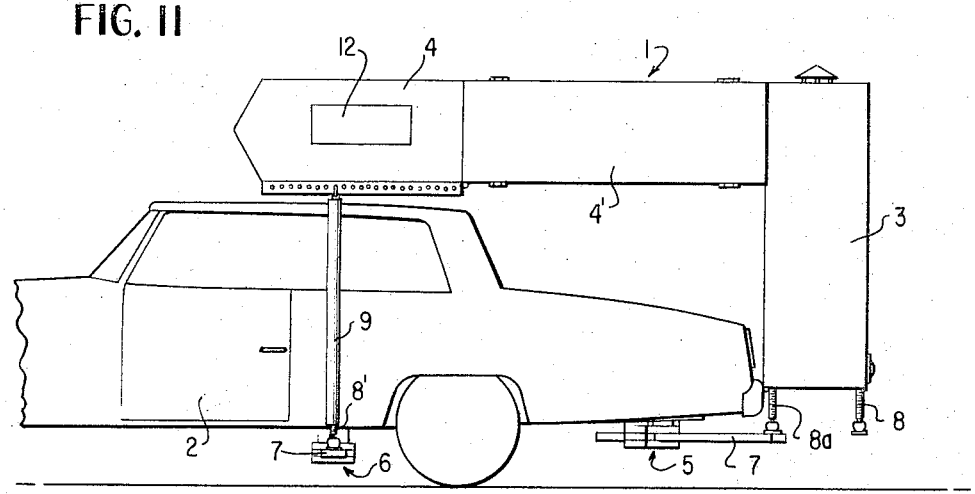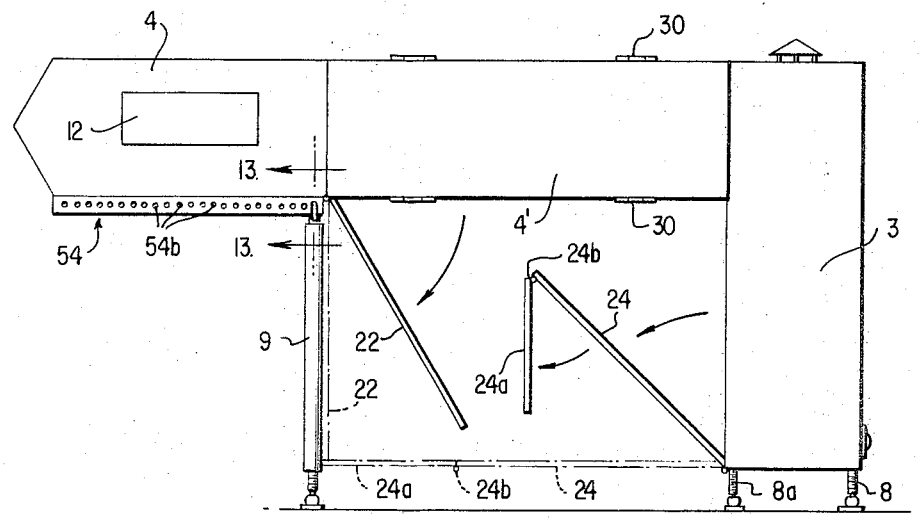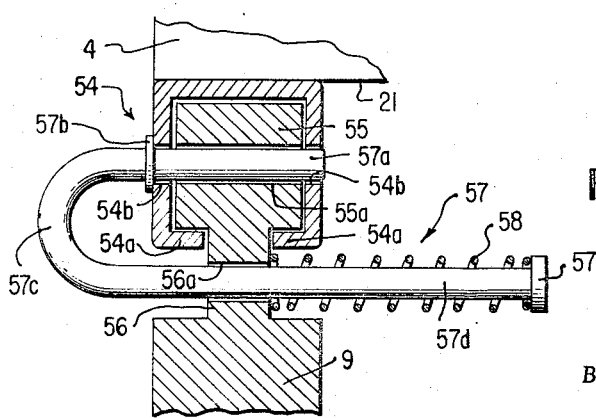

United States Patent Office 3,337,259
Patented Aug. 22, 1967

3,337,259
MOBILE BUILDINGS, DWELLINGS AND SHELTERS
John V. Henson, Baltimore, Md., assignor of ten percent to Ernest C. Trimble and Bruce Alderman, both of Towson, Md.
Filed June 4, 1965, Ser. No. 461,486
8 Claims. (Cl. 296—23)

This invention relates to mobile buildings, and more particularly to mobile dwellings, homes, shelters and the like.

The improved mobile dwelling of the present invention comprises, essentially, a housing assembly formed from a plurality of panels constituting a floor, side and end walls, and a roof, together with means for detachably securing the housing to the chassis of a vehicle for transport and placement in a desired location. The panels are constructed and arranged to form a combined living room, kitchen and dining area in the main section of the building, which section, when the building is assembled, is substantially cubical-shaped, sleeping quarters being located in an auxiliary section defined by a continuation of the roof of the main section, and a panel member spaced from the roof and in parallel relationship therewith, said auxiliary section communicating with the main section of the building, and being adapted to over-hang the roof of a vehicle during transport, as will be described more fully hereinafter. The housing assembly includes a doorway in an end wall of the main section of the building, together with windows positioned in the walls of the main and the auxiliary sections. In addition to appropriate living room furnishings, it is contemplated that the dwelling will be equipped with beds or bunks, a sink, stove, refrigerator, water tank and associated equipment.

An object of the invention is to provide an improved mobile dwelling assembly adapted to be detachably mounted on a vehicle for transport to a selected location, the dwelling assembly being readily removed from the vehicle for placement in stable supported position on the ground or other surface.

Another object of the invention is to provide improved means for securing the dwelling assembly to the chassis of a transport vehicle.

Yet another object of the invention is to provide an improved mobile dwelling assembly wherein the members used to support the dwelling in transport position on a vehicle are employed to support the dwelling in a stable, level position on the ground or other surface.

Still another object of the invention is to provide an improved dwelling assembly formed from a plurality of panels constituting the main structural components of the dwelling, certain of said panels being constructed and arranged to be collapsed or folded in a predetermined fashion, so as to provide a compact, stable unit adapted to be detachably secured to the chassis of an automotive vehicle.

A further object of the invention is to provide an improved mobile dwelling assembly which is strong and rugged in construction, consisting of relatively few movable parts not liable to get out of order even after long and continued used.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions which, for the purpose of explanation, have been made the subject of illustration.

In the drawings:

FIGURE 1 is a side elevational view of a mobile building of the present invention mounted for transport on a vehicle;

FIGURE 2 is an end elevational view of the building of FIGURE 1 showing it supported on the ground or other surface;

FIGURE 3 is a side elevational view, in section, of the building shown in FIGURES 1 and 2;

FIGURE 4 is a view similar to FIGURE 3, showing the building completely assembled;

FIGURE 5 is a view taken along line 5—5 of FIGURE 3;

FIGURE 6 is a view taken along line 6—6 of FIGURE 4;

FIGURE 7 is an enlarged side elevational view, partly in section, showing the mounting arrangement carried by the vehicle for supporting the building in transport position;

FIGURE 8 is a bottom plan view of the mounting arrangement shown in FIGURE 7;

FIGURE 9 is a view taken along line 9—9 of FIGURE 7;

FIGURE 10 is a sectional detail view of one of the ground engaging members;

FIGURE 11 is a side elevational view of a modification of the mobile building of the present invention mounted for transport on a vehicle;

FIGURE 12 is a side elevational view of the building of FIGURE 11 showing it supported on the ground or other surface; and FIGURE 13 is a view taken along line 13—13 of FIGURE 12.

Referring to the drawings, and more particularly to FIGURE 1, the mobile dwelling, designated generally by numeral 1, which is shown in transport position on the chassis of an automotive vehicle 2, comprises a main section 3, an auxiliary section 4, and an intermediate section 4'. The sections are supported on hanger assemblies 5 and 6, carried by the vehicle frame, and are detachably secured to arms 7 by means of jack members 8 attached to the bottom portion of the main section 3 in the vicinity of two opposite corners thereof, and by similar jack members 8' carried by members 9 positioned on opposite sides of the vehicle, said members extending upwardly of the sides of the dwelling as shown in FIGURES 1, 2 and 3, and providing support for the auxiliary and intermediate sections thereof.

Reference being had to FIGURES 2–4, and 6, the building illustrated in FIGURE 1 is shown supported on the ground or other suitable surface. A door 10 is provided in the back wall 11 of the main section 3 for access to the interior of the building, suitable windows 12 being formed in the side walls 13 and 14 of the main section and in each side wall 15 of the auxiliary section. Additional windows 16 are provided in the angularly disposed front walls 17 of the nose portion 18 of the auxiliary section, as shown in FIGURES 3 and 4. With reference to the design of the nose portion, it will be observed that walls 17 intersect in a straight line, and accordingly, it will be appreciated that the resulting inclination of said walls with respect to the horizontal materially decreases the wind resistance encountered during transport of the building, with concomitant economy in fuel consumption by the vehicle.

One of the important features of the present invention is the construction and arrangement of the components whereby the nose portion of the building over-hangs the roof of the vehicle without contact therewith during transport, thus enabling the building to be transported by the family automobile in lieu of a truck or similar conveyance. In view of the fact that the building is not attached or supported on the roof of the vehicle, it can be transported by conventional types of passenger cars, including convertibles. Additionally, the over-hang portion of the building is of functional value for the reason it may be employed for storage purposes, as well as for the accommodation of beds 19, FIGURES 3 and 4, within the compartment defined by the roof 20, the panel 21, and the front walls 17 of the auxiliary section.

As will be seen in FIGURE 3, a panel member 22 is hingedly connected at 23 to the panel 21, and a panel member 24 is hingedly connected at 25 to a floor panel 26, said panel members 22 and 24 being maintained at right angles to each other during transportation of the dwelling by means of a plurality of aligned latches 27 secured to the free edge portions of the panels at spaced intervals thereof. A table or bed 28, supported by chains or other flexible members 29 secured to the ceiling of the dwelling, may be stored adjacent the ceiling and adapted to be lowered on the chains for use, as shown in FIGURE 4. To complete the floor, and the wall portion opposite the door 10 of section 3 of the dwelling, the latch members 27 are released, thus permitting panels 24 and 22 to swing downwardly in the direction of the respective associated dotted lines to the positions shown in FIGURE 4, the panels being retained in fixed position by cooperative engagement of the latches in conjunction with the vertical supports.

In order to complete the assembly of section 3 of the dwelling, the collapsed portions of the side walls 13 and 14, FIGURES 5 and 6, are unfolded about hinge members 30 to enclose the sides of the main section of the building. As mentioned hereinbefore, certain basic appliances are provided in the living quarters, such as a stove 31, a refrigerator 32, and a sink 33. A water tank 34 and a gas bottle 35 are also provided.

The improved mounting arrangement carried by the vehicle for supporting the building in transport position, comprises similar hanger assemblies 5 and 6, FIGURE 1, one of the assemblies being shown in FIGURES 7, 8 and 9. Referring to FIGURE 7, each hanger assembly comprises a base 36 secured to a cross frame 37 of an automotive vehicle by means of bolts 38 adapted for insertion through openings 39 formed in the base member 36 in the vicinity of the corners thereof, the end portions of the bolts being threadable into bars or plates 40 adapted to seat on the web portion 41 of the frame whereby, upon turning the end portions of the bolts into the threaded openings of the bars 40, the base member 36 is securely clamped to the frame of the vehicle. The base member is formed with a slot 42 adapted to support the arm or bar 7, FIGURE 1, for slidable movement therein, said arm or bar providing support for the jack members 8 or 8', as described hereinabove.

In order to retain the arm 7 in desired extended position with respect to the base 36, a plurality of recesses 43 are provided in the bottom of the arm, FIGURES 8 and 9, adapted to seat spring biased, spherical-shaped detents 44, whereby to frictionally maintain the arm in selected position. Lateral movement of the arm with respect to the base is accomplished by pulling or pushing the arm by means of a hand grip 45 with sufficient force to unseat the detents, and permit the arm to be moved to bring the jack supporting areas 46 thereof into alignment with the base members 47 of the jacks 8 and 8' carried by section 3 of the dwelling and the supports 9, respectively. Stop means 48 secured to the end of the arm opposite the hand grip is provided for the purpose of preventing accidental removal or loss of the arm while the vehicle is being used for conventional purposes; that is to say, when not being used to transport a building or dwelling. Each jack supporting area 46 is defined by a plurality of openings 49 arranged in spaced relation on the circumference of a circle having its center on the longitudinal axis of the arm, the base member of each jack being provided with a similar array of openings 50 adapted to be brought into register with the openings in the arm, the base of the jack being secured to the arm by means of bolts 51 or other suitable fastening means.

As will be seen in FIGURE 10, the jack screw 52 is threadable into a tubular member 53 carried by main section 3 of the dwelling, or is threadable into one of the members 9 used to provide support for the auxiliary and intermediate sections 4 and 4', respectively. The base member 46 of the jack is swivelly mounted on the jack screw by means of a ball and socket connection, designated generally by numeral 46', whereby the jacks may be adjusted to bring the building into a level supported position, even though the selected location for the building includes uneven terrain. The swivel arrangement of the jack base also enables the base to be turned independently of the jack screw so that the openings 50 in the base of the jack may be easily brought into register with the openings 49 in the arm 7 for insertion of the bolts 51, when mounting the dwelling for transport.

It will be observed that the hanger assembly 6, FIGURE 1, is mounted so that the slidable arm 7 moves in a direction perpendicular to a plane determined by a pair of bolts 38 on the same side of transverse frame 37 of the vehicle. The hanger assembly 5 is of substantially the same design as the hanger 6, except that hanger 5' is secured to the frame of the vehicle so that the arm 7 extends diagonally to the rear of the vehicle in order to bring its jack supporting area, when the arm is extended, into alignment with the base of the jack. From the foregoing description of the hanger assemblies, it will be understood that the dwelling is supported by four jacks, two of which are secured at opposite ends of the arm associated with hanger assembly 6, and one secured to each arm 7 associated with the hangers 5 mounted on the rear portion of the vehicle frame.

A modification of the mobile home is illustrated in FIGURES 11 to 13 wherein hanger assembly 6 and associated arms 7 are positioned forwardly of the rear wheels of the automobile and additional jack members 8a are attached to the forward edge of the bottom portion of the main section 3. Jack members 8a are secured to the arms 7 carried by the rear hanger assembly 5 during transportation of the home, while jack members 8 are employed for supporting the home at the campsite as illustrated in FIGURE 12.

A longitudinally extending channel member 54 is secured to the panel 21 of the auxiliary section 4 on each side thereof. Each channel is provided with a pair of spaced, inwardly extending arms 54a providing flanges adapted to slidably support a head member 55 integrally connected to the upper end of the support member 9 by means of a neck portion 56. By this construction and arrangement, the channel members form a track for the head 55 on each support member 9 whereby the support members may be moved longitudinally of the home to suitably support the home while being transported, as illustrated in FIGURE 11, or at the campsite, as shown in FIGURE 12.

In order to maintain the support members 9 at the selected position, each channel and associated support member head is provided with detent means 57 comprising a rod 57a slidably mounted in a transverse bore 55a formed in the head 55, said rod extending through apertures 54b formed in each of the parallel side walls of the channel member and aligned with the bore 55a. A collar 57b is secured to the outer end portion of rod 57a and is adapted to abut the outer side wall of the channel member to thereby limit the inward movement of the rod relative to the channel member. The end of rod 57a is integrally connected to one end of a bight portion 57c, the opposite end of the bight portion being integrally connected to a rod 57d, which is parallel to rod 57a and extends through an aperture 56a formed in the neck 56. A coil spring 58 is positioned concentrically relative to the rod 57d and has one end abutting the side face of the neck portion 56 and the opposite end abutting a flange member 57e secured to the end of rod 57d, whereby the biasing force of the spring urges the rod 57a inwardly toward the channel to thereby maintain the support member 9 at the desired preselected position.

When it is desired to change the position of the support member 9, the bight portion 57c of the detent means is grasped and the rod 57a is pulled outwardly from the bore 55a thereby compressing spring 58 and allowing the support member 9 to be moved along the channel member until the desired position is attained; whereupon, the detent is released causing the spring to expand whereby the rod 57a slides through the aperture 54b and into the bore 55a of the head member 55.

As will be seen in FIGURE 12, the length of the intermediate section 4' can be increased to thereby provide a larger living area when the home is erected, in which case, the panel 24 of the main section 3 is provided with an extension panel 24a hingedly connected as at 24b to the edge of the panel 24, whereby, in the erected position, panel 24a is disposed normal to the lower edge of panel 22, as shown in dotted lines. In the folded position, panel extension 24a will be disposed normal to the upper edge of the panel 24 and is adapted to be secured to the adjacent end of the panel 22 to thereby form the bottom panel for the intermediate section 4'.

As an alternative, an extension panel could be hingedly connected to the free end of panel 22, in lieu of panel 24a, whereby, in the erected position the extension panel would be normal to the lower edge of panel 22 and the free end of the extension panel would be secured, by suitable latching means, to the adjacent edge of panel 24.

To complete the assembly of the dwelling, illustrated in FIGURES 11 and 12, the collapsed portion of the side walls are unfolded about hinge members 30 to enclose the sides of the main section of the building as described hereinabove with regard to the dwelling illustrated in FIGURES 1 and 2.

The panel of the dwelling are contructed from either lightweight metal, plastic or polystyrenes to thereby provide the unit with great rigidity, durability and stability while at the same time maintaining the weight of the dwelling at a minimum so that it may be transported by the family automobile.

The arrangement of the improved mobile housing assembly permits a boat trailer to be pulled by the automobile, in conjunction with transport of the dwelling, and accordingly, the user will have his home and boat when he arrives at a selected vacation site. In accordance with the present invention, a relatively large, fully equipped housing area is provided, said housing area having the conveniences of a house trailer, without the expense of other extras, for example, additional license plates, tolls, gas consumption, auxiliary wheels, insurance, and other charges at vacation sites.

While I have shown and described preferred embodiments of my invention, I wish it to be understood that I do not confine myself to the precise details of construction herein set forth by way of illustration, as it is apparent that many changes and variations may be made therein, by those skilled in the art, without departing from the spirit of the invention or exceeding the scope of the appended claims.

I claim:

1. A home assembly secured to a vehicle for transport and detachable therefrom for placement in a desired location comprising a housing assembly having a vertically extending main section, an auxiliary section, and an intermediate section connecting the auxiliary section to the main section, said auxiliary, intermediate and main sections having a horizontally disposed panel forming a roof for the housing assembly, the auxiliary and intermediate sections each having a horizontally disposed panel parallel to and spaced below the housing roof, the second-mentionel panels being disposed in a horizontal plane in proximity to but spaced from the roof of the vehicle, the second-mentioned horizontal panel in the auxiliary section forming a floor therein, a nose portion secured to the end of the auxiliary section and facing in the direction of travel of the vehicle, side walls secured to the nose portion and horizontally disposed panels for enclosing the auxiliary section and intermediate section; the main section having a vertical wall extending normal to the second-mentioned horizontal panels and spaced rearwardly of the vehicle, the upper edge of said vertical wall being adjacent and secured to the edge of the second-mentioned horizontal panel in the intermediate section, said main section having a horizontal panel positioned in a horizontal plane extending through the running gear of the vehicle, said horizontal panel forming a floor for the main section, the lower edge of said vertical wall being secured to one edge of the main section floor, the main section having a second vertically extending wall spaced rearwardly from and parallel to the first-mentioned vertical wall, the lower edge of said second-mentioned vertical wall being secured to the opposite edge of the main section floor, the upper edge of the second-mentioned vertical wall being secured to the rearward edge of the housing assembly roof, side panels secured to the vertical walls, main section floor and edges of the housing assembly roof to thereby enclose the main section, and means operatively connected to the housing assembly for detachably securing the assembly to the chassis of the vehicle.

2. A home assembly according to claim 1, wherein the leading edge of the second-mentioned horizontal panel in the intermediate section is pivotally connected to the trailing edge of the corresponding panel in the auxiliary section, the lower edge of the first-mentioned vertical wall in the main section being pivotally connected to the edge of the main section floor, whereby the horizonal panel in the intermediate section is adapted to be pivoted downwardly into a vertical plane to form an end wall and the vertical wall in the main section is adapted to be pivoted downwardly into a horizontal plane to form an extension of the floor in the main section, and a plurality of hingedly connected panels secured to the auxiliary section and adapted to be unfolded and secured to the end wall and floor to thereby form side walls, whereby assembly of the main section is completed when the home assembly has been removed from the vehicle for placement in a desired location.

3. A home assembly according to claim 1 wherein a door is positioned in the second-mentioned vertical wall in the main section to provide access to the home assembly.

4. A mobile home according to claim 1, wherein the means for detachably securing the assembly to the chassis of a vehicle comprises, a plurality of hanger assemblies secured to the vehicle chassis frame, an extensible arm slidably mounted in each hanger assembly, jack means secured to the housing assembly, said jack means including a base member adapted to be supported by a respective arm while the housing assembly is being transported by the vehicle, said base member and associated jack means being removable from the extensible arm and adapted to support the housing assembly in a stable, level position on the ground.

5. A home assembly secured to an automobile for transport and detachable therefrom for placement in a desired location comprising, a housing assembly including a floor, side and end walls, and a roof, said housing assembly having a vertically extending main section, an auxiliary section and a horizontally disposed intermediate section connecting the auxiliary section to the main section, said main section having a vertical wall adapted to be pivoted into a horizontal plane below the intermediate section to form a floor, the intermediate section having a horizontally disposed wall adapted to be pivoted into a vertical plane to form an end wall, the lower edge of said end wall being adjacent and secured to the edge of the floor, a plurality of hingedly connected panels secured to the auxiliary section and adapted to be unfolded and secured to the end wall and floor to thereby form side walls, whereby assembly of the main section is completed, means operatively connected to the housing assembly for detachably securing the assembly to the chassis of the automobile, said means including a vertically extending support member having its upper end secured to the auxiliary section, track means secured to the auxiliary section, the upper end of said support member slidably mounted within said track means, whereby the position of the support member relative to the assembly may be varied, and detent means operatively connected between the upper end of said support member and track means for maintaining the support member in a selected position.

6. A home assembly according to claim 5, wherein an extension panel is pivotally connected to the free end of the vertical wall of the main section and adapted to be disposed in a horizontal plane normal to the free end of the end wall.

7. A home assembly according to claim 5, wherein means are positioned within the auxiliary section of the housing to provide permanent accommodations for sleeping, and the main section of the housing having a stove, refrigerator and sink disposed therein, whereby the utilities may be used while the housing is mounted on the automobile or while erected at the campsite.

8. A home assembly comprising, a housing assembly having a vertically extending main section, an auxiliary section, and an intermediate section connecting the auxiliary section to the main section, said auxiliary, intermediate and main sections having a horizontally disposed panel forming a roof for the housing assembly, the auxiliary and intermediate sections each having a horizontally disposed panel parallel to and spaced below the housing roof, the second-mentioned horizontal panel in the auxiliary section forming a floor therein, a nose portion secured to the end of the auxiliary section, side walls secured to the nose portion and horizontally disposed panels for enclosing the auxiliary section and intermediate section; the main section having a vertical wall extending normal to the second-mentioned horizontal panels, the upper edge of said vertical wall being adjacent and secured to the edge of the second-mentioned horizontal panel in the intermediate section, said main section having a horizontal panel, said horizontal panel forming a floor for the main section, the lower edge of said vertical wall being secured to one edge of the main section floor, the main section having a second vertically extending wall spaced rearwardly from and parallel to the first-mentioned vertical wall, the lower edge of said second-mentioned vertical wall being secured to the opposite edge of the main section floor, the upper edge of the second-mentioned vertical wall being secured to the rearward edge of the housing assembly roof, side panels secured to the vertical walls, main section floor and edges of the housing assembly roof to thereby enclose the main section.

References Cited
UNITED STATES PATENTS 3,185,518    5/1965    Zentner.
3,257,760    6/1966    Calthorpe _____ 52—71 X BENJAMIN HERSH, *Primary Examiner.*

PHILLIP GOODMAN, *Assistant Examiner.*